(12) United States Patent
Yagisawa

(10) Patent No.: US 8,287,946 B2
(45) Date of Patent: Oct. 16, 2012

(54) COATING PROCESS FOR FORMING FILMS CONTAINING ULTRAVIOLET- OR INFRARED-SCREENING AGENTS

(75) Inventor: Katsuo Yagisawa, Fukushima (JP)

(73) Assignee: Fumin Corporation, Fukushima (JP)

( * ) Notice: Subject to any disclaimer, the term of this patent is extended or adjusted under 35 U.S.C. 154(b) by 1356 days.

(21) Appl. No.: 11/916,013

(22) PCT Filed: Jun. 1, 2006

(86) PCT No.: PCT/JP2006/311013
§ 371 (c)(1),
(2), (4) Date: Nov. 29, 2007

(87) PCT Pub. No.: WO2006/129764
PCT Pub. Date: Dec. 7, 2006

(65) Prior Publication Data
US 2009/0311517 A1    Dec. 17, 2009

(30) Foreign Application Priority Data
Jun. 3, 2005    (JP) .................................. 2005-163518

(51) Int. Cl.
*B32B 7/00*    (2006.01)
(52) U.S. Cl. ........................................ 427/162; 427/336
(58) Field of Classification Search ............ 428/336
See application file for complete search history.

(56) References Cited

U.S. PATENT DOCUMENTS

| 5,863,599 | A | * | 1/1999 | Lew ............................... 427/154 |
| 6,221,436 | B1 | * | 4/2001 | Perry et al. ................. 427/430.1 |
| 6,875,836 | B2 |   | 4/2005 | Yoshihara |
| 6,933,019 | B2 | * | 8/2005 | Mayer et al. ................ 427/421.1 |
| 2004/0043210 | A1 | * | 3/2004 | Seto et al. ..................... 428/331 |
| 2004/0058177 | A1 | * | 3/2004 | Yoshikawa et al. ........... 428/515 |
| 2004/0062875 | A1 | * | 4/2004 | Chappa et al. ................. 427/421 |
| 2004/0076758 | A1 | * | 4/2004 | Lettmann et al. .......... 427/407.1 |
| 2004/0087711 | A1 | * | 5/2004 | Matsumura et al. .......... 524/548 |
| 2008/0199604 | A1 | * | 8/2008 | Lettmann et al. ............. 427/140 |

FOREIGN PATENT DOCUMENTS

| JP | 11221516 | 8/1999 |
| JP | 11290770 | 10/1999 |
| JP | 2002273327 | 9/2002 |
| JP | 2003064308 | 3/2003 |
| JP | 2004308378 | 11/2004 |
| JP | 2005179472 | 7/2005 |

OTHER PUBLICATIONS

International Search Report dated Aug. 22, 2006.

* cited by examiner

*Primary Examiner* — Timothy Meeks
*Assistant Examiner* — Nathan T Leong
(74) *Attorney, Agent, or Firm* — Dickinson Wright PLLC

(57) ABSTRACT

Conventional techniques for forming ultraviolet- or infrared-screening coating films have the problem of requiring several recoating steps in order to attain a desired coating weight and therefore failing in forming high-strength coating films and the problem of causing uneven coating, mottling, spotting, blushing, partial breakage, or cracking in some working atmospheres. In order to solve the problems, a coating fluid comprising at least an ultraviolet-screening agent and/or an infrared-screening agent, a binder and a polyhydric alcohol base solvent and having a polyhydric alcohol content of 50 to 95 wt % is applied to a substrate with a coater whose ejection nozzle has a tip diameter of 0.5 to 3.0 mm and which is equipped with a blower for forming an air curtain at an ejection pressure of the nozzle of 0.01 to 0.098 MPa and then dried to form a film containing an ultraviolet-screening agent and/or an infrared-screening agent on the surface of the substrate.

13 Claims, No Drawings ant or an infrared-screening agent. Furthermore, it relates to a coating film formed by the coating process and an article having the coating film on the surface.

COATING PROCESS FOR FORMING FILMS CONTAINING ULTRAVIOLET- OR INFRARED-SCREENING AGENTS

TECHNICAL FIELD

The present invention relates to a coating process for forming a coating film containing an ultraviolet-screening agent or an infrared-screening agent. Furthermore, it relates to a coating film formed by the coating process and an article having the coating film on the surface.

BACKGROUND ART

It has been carried out to form a coating film containing an ultraviolet-screening agent on the surface of window glasses or plastics of buildings, window glasses of automobiles, etc. for inhibiting penetration of ultraviolet rays into rooms or automobiles to prevent articles from fading or discoloration caused by sunlight and protect human bodies from harmful ultraviolet rays. It has also been carried out to form a coating film containing an infrared-screening agent to prevent penetration of infrared rays into rooms or automobiles to inhibit rising of temperature in rooms or automobiles.

A coating film containing an ultraviolet-screening agent or infrared-screening agent is formed generally by brushing or spray coating with a spray gun a coating fluid comprising an ultraviolet-screening agent or an infrared-screening agent, a binder component, a solvent and the like. For example, the following Patent Document 1 discloses to coat by brushing or spraying a coating fluid containing an ultraviolet-screening agent or an infrared-screening agent and a reaction product of an alkoxysilane containing epoxy group and an alkoxysilane containing amino group having active hydrogen as a binder component. Furthermore, Patent Document 1 also discloses that the coating can be carried out using a spray gun controlled in opening time and closing time of spray nozzle by a nozzle controlling valve worked by computers.
Patent Document 1: JP-A-2003-64308 (Paragraph 0013)

DISCLOSURE OF INVENTION

Problem to be Solved by the Invention

The process disclosed in the above Patent Document 1 is not for general-purpose because specific binder components must be used. Furthermore, although Examples in the Patent Document 1 disclose that a coating film having no problems such as uneven coating and mottling can be formed by coating a solution impregnated in a nonwoven fabric and curing the coat at room temperature, the Patent Document 1 has no examples of coating by spray coating which provides wide coating area per time, and it is not clear to what extent the improvement can be attained. Therefore, an investigation was conducted using a spray coater to find that under the usual coating conditions of spraying, the coating fluid formed into ultrafine particles under high pressure by reducing the ejection nozzle diameter, the ejection amount is small and several recoating steps are necessary for attaining a desired coating weight, and as a result, strong coating films can hardly be obtained and there occur problems of uneven coating, mottling, spotting, blushing, partial breakage, and cracking in some working atmospheres. In such coating films, separation or exfoliation occurs, and ultraviolet-screening performance or infrared-screening performance cannot be continuously utilized for a long period of time.

Under the circumstances, the present invention provides a coating process which can form in any working atmospheres a coating film containing an ultraviolet-screening agent or an infrared-screening agent which has overcome the above problems in conventional processes and is excellent in durability and abrasion resistance and has no problems such as uneven coating, mottling, spotting, blushing, partial breakage, or cracking.

Means for Solving the Problem

As a result of an intensive research conducted by the inventors, they have considered that the conventional spray coating requires several recoating steps because a coating fluid containing an ultraviolet-screening agent or infrared-screening agent is made into ultrafine particles and then is sprayed, and a desired coating film cannot be obtained because the drying conditions for the surfaces coated at the respective steps differ delicately. Thus, it has been found that when a relatively large tip bore diameter of the ejection nozzle of coaters such as spray gun and a relatively low ejection pressure of the ejection nozzle are employed in order to coat the coating fluid without making the droplets of the coating fluid into ultrafine particles and besides a coating fluid containing a specific amount of a polyhydric alcohol is used in order to give a relatively high viscosity to the coating fluid, the number of coating steps can be reduced and a desired coating film can be obtained. It has further been found that when a coater provided with a blower which forms an air curtain to enclose the coating fluid from the periphery of the coating fluid ejection nozzle toward the coating surface is used in order to perform uniform film formation and drying just after coating, the droplets of the coating fluid are crushed with pressure of the blown air and are joined with each other to perform film formation and drying, thereby obtaining a desired coating film.

That is, the present invention relates to a coating process for forming a coating film containing an ultraviolet-screening agent and/or an infrared-screening agent on the surface of a substrate by coating on the substrate a coating fluid comprising at least an ultraviolet-screening agent and/or an infrared-screening agent, a binder component and a polyhydric alcohol solvent and having a content of the polyhydric alcohol of 50-95% by weight with a coater whose ejection nozzle has a tip bore diameter of 0.5-3.0 mm at an ejection pressure of the nozzle of 0.01-0.098 MPa and then drying the resulting coat. The present invention further relates to a coating process for forming a coating film containing an ultraviolet-screening agent and/or an infrared-screening agent on the surface of the substrate by coating on the substrate the above coating fluid with a coater which is provided with a blower for forming an air curtain and whose ejection nozzle has a tip bore diameter of 0.5-3.0 mm and then drying the resulting coat.

Advantages of the Invention

According to the coating process of the present invention, there can be formed on the surface of any articles a coating film containing an ultraviolet-screening agent and/or an infrared-screening agent which is excellent in durability and abrasion resistance, less in the problems of uneven coating, mottling, spotting, blushing, partial breakage, or cracking, and ultraviolet-screening performance or infrared-screening performance can be effectively utilized. Furthermore, a uniform ultraviolet-screening coating film or infrared-screening coating film can be simply formed at one coating step in any working atmospheres, and transparency of the film can be sufficiently ensured.

Therefore, the coating process of the present invention can be simply applied to window glasses at the time of building or rebuilding of houses, and can also be simply applied to automobiles at the time of oil supply or car washing. When ultraviolet-screening coating films are formed on window glass or front glass, side glass and rear glass of automobiles, ultraviolet rays can be intercepted, and thus the articles can be prevented from fading or discoloration caused by sunlight and human bodies can be protected from harmful ultraviolet rays. When infrared-screening films are formed, rising of temperature in rooms or automobiles can be inhibited, which can contribute to saving of energy.

BEST MODE FOR CARRYING OUT THE INVENTION

As the coaters used in the present invention, there may be used commercially available spray guns and the like, and they have at least a supply means which supplies a coating fluid containing an ultraviolet-screening agent and/or an infrared-screening agent and an ejection nozzle which ejects the coating fluid supplied from the supply means. It is necessary that the tip bore diameter of the ejection nozzle is 0.5-3.0 mm and the ejection pressure of the ejection nozzle is 0.01-0.098 MPa. By employing these ranges, the coating fluid can be ejected as droplets having a diameter of about 0.5-3.0 mm corresponding to the tip bore diameter of the nozzle, namely, a diameter close to that of water drops, without making the coating fluid into ultrafine particles. The tip bore diameter of the ejection nozzle is preferably about 1.0-2.0 mm, more preferably about 1.0-1.5 mm. If the tip bore diameter is less than 0.5 mm, the droplets are apt to become finer and besides the coating fluid in a desired amount cannot be coated at one step, and if it is recoated at several steps, blushing of the coat is apt to occur to cause decrease of transparency or strength, or separation of the coating films. On the other hand, if the tip bore diameter is more than 3.0 mm, sagging occurs during coating, resulting in conspicuous partial difference in thickness of the resulting film to cause poor appearance of the coating film, such as rainbow color. As the supply means, there may be employed conventional means such as blowing-up supply, gravity supply, and pressure supply, and it is preferred to use a supply pump of the pressure supply type, and in this case, preferably the supply is carried out under relatively low ejection pressure of the ejection nozzle, preferably 0.01-0.09 MPa, more preferably about 0.01-0.05 MPa. If the ejection pressure is lower than 0.01 MPa, the coating fluid can hardly be coated on the substrate with keeping uniform size of droplets of the coating fluid to cause occurrence of spotting. If the ejection pressure exceeds 0.098 MPa, the droplets are apt to become finer, and besides the coating fluid is scattered to reduce coating efficiency and uniform film can hardly be formed. The amount of coating fluid ejected from the ejection nozzle is preferably 30-200 ml/min, more preferably about 50-100 ml/min. If the ejection amount is less than 30 ml/min, the droplets close to water drops in diameter can hardly be joined to each other to cause occurrence of spotting, and if the ejection amount exceeds 200 ml/min, sagging of the coating fluid occurs during coating, resulting in conspicuous partial difference in thickness of the resulting film to cause poor appearance of the coating film, such as rainbow color. The supply means such as supply pump and the coating fluid ejection nozzle are connected directly or through a hose or a pipe to constitute a coater, and the coating fluid supplied from the supply means and ejected from the ejection nozzle is carried to the coating surface and deposited thereon.

A preferred coater used in the present invention has at least a supply means which supplies a coating fluid containing an ultraviolet-screening agent and/or an infrared-screening agent, a blower which supplies air and a gun which ejects together the coating fluid supplied from the supply means and the air supplied from the blower. Said gun has a coating fluid ejection nozzle inside the tip thereof and an air blow-off opening on the outer peripheral side of the coating fluid ejection nozzle to form an air curtain in such a manner that it encloses the ejected coating fluid. The supply means such as supply pump and the gun (coating fluid ejection nozzle) are connected directly or through a hose or a pipe, and the blower and the gun (air blow-off opening) are also connected with a hose or a pipe to constitute a coater, and the coating fluid supplied by the supply means and ejected from the ejection nozzle is enclosed with a large amount of air flow (called air curtain) supplied by the blower outside the coater and blown off from the air blow-off opening and is carried to the coating surface and deposited thereon. By employing the coater provided with a blower which forms air curtain, since the outer side of the coating fluid ejected from the coating fluid ejection nozzle is enclosed with air, the coating fluid is hardly scattered around, and the causes to injure the health of workers decreases much, loss of the coating fluid reduces, and masking on a large scale becomes unnecessary.

When the air blown off from the air blow-off opening is low in pressure and large in quantity, more sufficient air curtain is obtained, which is preferred. Therefore, the blower for forming the air curtain has an air blowing pressure of preferably 0.01-0.098 MPa, more preferably 0.01-0.05 MPa, further preferably about 0.015-0.04 MPa. In case the air blowing pressure is within the above range, an air curtain of a sufficient quantity can be formed, which is preferred, and if the air blowing pressure is lower than 0.01 MPa, formation of the air curtain is insufficient, and if it is higher than 0.098 MPa, the quantity of air is too large, which is not preferred. The quantity of air flow is preferably about 500-5000 liters/min, more preferably about 1000-3000 liters/min. The temperature of the air is preferably higher than the temperature of coating atmosphere by at least 10° C., more preferably by about 10-50° C., further preferably by about 10-25° C. By setting the air temperature at higher than the temperature of coating atmosphere, drying and curing of the coating film can be simultaneously carried out. In order to generate air having a temperature higher than the temperature of coating atmosphere, it is preferred to use a blower provided with a high rotation type turbine, and the temperature of the air can be raised by its rotation frictional heat. The number of rotation of the high rotation type turbine is usually about 21000-25000 per minute, and the air temperature can be adjusted by suitably controlling the number of rotation, and in this case, a special warm air generating means is not needed. As such a coater, there may be preferably used a warm air low pressure coater (SG-2500, SG-2000, SG-91, or the like) manufactured by Chiron GmbH, a spray gun manufactured by Wagner Co., Ltd., etc. When the air temperature is raised to a temperature higher than the temperature of coating atmosphere by at least 30° C., and if use of high rotation type turbine is insufficient for raising of the temperature, there may be provided a heating means for generation of warm air of a given temperature.

Next, the coating fluid containing an ultraviolet-screening agent and/or an infrared-screening agent comprises at least an ultraviolet-screening agent and/or an infrared-screening agent, a binder component and a polyhydric alcohol solvent, and it is important that the coating fluid contains the polyhydric alcohol in an amount of 50-95% by weight as a solvent. When the content of the polyhydric alcohol is at least within the above range, a desired coating film can be obtained by coating the coating fluid with the above coater, and the content is preferably about 60-90% by weight, more preferably about 70-90% by weight. If the content of the polyhydric alcohol is less than 50% by weight, volatilization drying proceeds slowly to cause sagging of the fluid, and a desired coating film cannot be obtained. If the content of the polyhydric alcohol is more than 95% by weight, the content of the ultraviolet-screening agent or the infrared-screening agent is small, and performance of it cannot sufficiently be utilized and a desired coating film cannot be obtained.

The solvent added to the coating fluid is essentially a polyhydric alcohol, and the amount thereof is in the range of 50-95% by weight as mentioned above. The polyhydric alcohol is an alcohol having two or more hydroxyl groups in a molecule, and there may be used glycols which are dihydric alcohols having two hydroxyl groups, glycerin which is a trihydric alcohol having three hydroxyl groups, etc, Tetrahydric or higher alcohols can also be used, but more preferred are glycols which are dihydric alcohols of low boiling point. Examples of the glycols are ethylene glycol, propylene glycol, trimethylene glycol, 1,4-butanediol, 1,5-pentanediol, 1,6-hexanediol, and 1,7-heptanediol, and propylene glycol is most preferred. In addition to the polyhydric alcohols, there may be added at least one solvent selected from inorganic solvents such as water, and organic solvents such as monohydric alcohols, ethers and amides, and the amount thereof can be optionally adjusted considering the viscosity of the coating fluid, and the like. For example, when a monohydric alcohol such as methyl alcohol, ethyl alcohol, propyl alcohol or butyl alcohol is used together with the polyhydric alcohol, the drying temperature can be relatively low.

The binder component added to the coating solution acts as a binder in forming a coating film, and known binder components can be used. For example, there may be used those optionally selected from silicone resins, alkoxysilanes, partial hydrolytic condensates of alkoxysilanes, hydrolyzates of alkoxysilanes, fluorine-contained resins, polyethylene, polyvinyl chloride, vinyl acetate resins, polystyrenes, polypropylenes, acrylic resins, silicone acrylic resins, methacrylic resins, polycarbonates, polyamides, polyacetals, urea resins, phenolic resins, unsaturated polyester resins, polyurethanes, acrylic urethane resins, alkyd resins, epoxy resins, melamine resins, water-glass, cements, gypsum, etc. In the present invention, silicone resins, alkoxysilanes, partial hydrolytic condensates of alkoxysilanes and hydrolyzates of alkoxysilanes are more preferred because they provide high film hardness. The silicone resins are polymers having repeating units ($-Si-O-$)$_n$ of siloxane bond as a main chain and alkyl group, aryl group or the like as a side chain, and are preferably silicones having a three-dimensional network structure, and may be modified silicones such as epoxy-modified, polyester-modified, alkyd-modified and acryl-modified silicones. The alkoxysilanes include, for example, monomers such as tetraalkoxysilanes, monoalkyltrialkoxysilanes, dialkyldialkoxysilanes and trialkylmonoalkoxysilanes. As the alkoxyl group thereof, there may be used alkoxyl groups of about 1-8 carbon atoms such as methoxyl group, ethoxyl group, propoxyl group and butoxyl group. As the alkyl groups, there may be used alkyl groups of about 1-8 carbon atoms such as methyl group, ethyl group, propyl group and butyl group. Specific examples of the alkoxysilanes are tetramethoxysilane, tetraethoxysilane, tetrapropoxysilane, monomethyltrimethoxysilane, monoethyltriethoxysilane, monopropyltripropoxysilane, dimethyldimethoxysilane, diethyldiethoxysilane, dipropyldipropoxysilane, trimethylmonomethoxysilane, triethylmonoethoxysilane, tripropylmonopropoxysilane, etc.

The partial hydrolytic condensates of alkoxysilanes used as binder components are oligomers such as dimers, trimers or higher polymers obtained by partial hydrolysis and condensation of the above alkoxysilane monomers, and are preferably those which have about 2-9 silicon atoms in one molecule. The hydrolyzates of alkoxysilanes are those obtained by subjecting alkoxysilanes to nearly complete hydrolytic condensation to form particulate, which is generally called organosilica sol.

The amount of the binder component added to the coating fluid can be suitably set depending on the use, and for example, it is preferably 4-49% by weight, more preferably about 5-35% by weight, further preferably about 5-20% by weight in terms of solid content. If it is less than 5% by weight, adhesion to substrate or previously formed primary coat or film strength tends to deteriorate, which is not preferred, and if it exceeds 49% by weight, the content of the binder component in the resulting coating film is too high, and hence ultraviolet-screening performance or infrared-screening performance is not sufficiently exhibited.

The ultraviolet-screening agents include materials which reflect ultraviolet rays or materials which absorb ultraviolet rays, and the infrared-screening agents include materials which reflect infrared rays or materials which absorb infrared rays, and further include materials which reflect or absorb only near infrared rays. As the ultraviolet-screening agents, there may be used known materials, and examples thereof are organic compounds such as benzotriazole compounds and benzophenone compounds, and inorganic compounds such as titanium dioxide, hydrous titanium oxide, hydrated titanium oxide, metatitanic acid, orthotitanic acid, titanium hydroxide, zinc oxide, zinc silicate and cerium oxide. The above titanium compounds such as titanium dioxide per se have strong photocatalytic performance, and, therefore, in case this performance causes decomposition of the binder component, the photocatalytic performance can be lowered to make difficult the decomposition of the binder component by coating the surface of the particles of the titanium compounds with at least one of oxides, hydrated oxides and hydroxides of silicon, aluminum, zirconium, etc. As the infrared-screening agents, known materials can be used, and examples thereof are organic compounds such as perylene compounds, aniline compounds and cyanine compounds; inorganic compounds such as antimony-doped tin oxide, indium-doped tin oxide, tin-doped indium oxide, aluminum-doped zinc oxide, mica-titanium (titanium oxide-coated mica), iron oxide-coated mica, basic lead carbonate, bismuth oxychloride, selenium oxide, zinc oxide, titanium dioxide, rhodium oxide, ruthenium oxide, and metal complexes of copper, silver, iron and manganese; and metals such as aluminum, gold, silver, copper, chromium, nickel, indium, palladium and tin, and alloys thereof. The amount of the ultraviolet-screening agents and/or infrared-screening agents in the coating fluid can be suitably set, and, for example, is preferably 1-46% by weight, more preferably about 5-35% by weight, further preferably about 5-20% by weight in terms of solid content. If the amount is less than 1% by weight, the ultraviolet-screening performance or infrared-screening performance is sometimes insufficient, and if it exceeds 46% by weight, the amount of the binder component in the resulting coating film is too small, and the film strength tends to lower. When the ultraviolet-screening agents or infrared-screening agents are used in the form of solid, the particle diameter and shapes thereof are not particularly limited, and those of any sizes and shapes can be used, but in case transparency must be ensured, such particle diameter and shape as capable of transmitting the visible light can be suitably selected, and it is preferred to use those of, for example, about 1-100 nm in particle diameter.

To the coating fluid used in the present invention, there may be optionally added additives such as dispersant, thickening agent, viscosity adjustor, curing agent, cross-linking agent, leveling agent, surface active agent, pigment, filler, adsorbent, deodorizer, anti-fungus agent, conducting agent, antistatic agent and electromagnetic wave-screening agent in addition to the ultraviolet-screening agent and/or infrared-screening agent, the binder component and the polyhydric alcohol solvent. Furthermore, if necessary, a polymerization catalyst and a polymerization initiator for the binder component may be added. The coating fluid can be prepared by mixing the ultraviolet-screening agent and/or the infrared-screening agent, the binder component and the polyhydric alcohol solvent, and, if necessary, the additives in given amounts, respectively, and the viscosity of the coating fluid can be adjusted by the kind of the solvent or the amount of the solvent. The total solid concentration of the coating fluid is preferably about 5-50% by weight, more preferably 10-50% by weight, further preferably 20-45% by weight. If the total solid concentration of the coating fluid is less than 5% by weight, the resulting coating film tends to become insufficient in ultraviolet-screening performance or infrared-screening performance, and if it exceeds 50% by weight, the resulting coating film is apt to have cracks, which tend to cause reduction of transmittance of the coating film. The amount of the ultraviolet-screening agent and/or infrared-screening agent with respect to the total solid concentration can be suitably set depending on the use, and even about 2-90% by weight can give sufficient performance and is suitable, and about 5-80% by weight is more preferred. In the present invention, it is preferred to use a coating fluid which has a total solid concentration of 5-50% by weight and comprises at least the binder component in an amount of 4-49% by weight in terms of solid content and the polyhydric alcohol in an amount of 50-95% by weight.

Using a coater of which the ejection nozzle has a tip bore diameter of 0.5-3.0 mm or a coater of which the ejection nozzle has a tip bore diameter of 0.5-3.0 mm and which is provided with a blower for forming an air curtain, a coating fluid comprising at least an ultraviolet-screening agent and/or an infrared-screening agent, a binder component and a polyhydric alcohol solvent and having a polyhydric alcohol content of 50-95% by weight is coated on a substrate under an ejection pressure of the nozzle of 0.01-0.098 MPa and then the resulting coat is dried to form a coating film containing the ultraviolet-screening agent and/or the infrared-screening agent on the surface of the substrate. The coating speed, the number of coating step, the spraying height, etc. can be optionally controlled depending on the substrate, setting conditions of coating weight, etc. For example, in the present invention, the coating can be carried out in a short time of about 0.3-30 seconds per 1 m of lengthwise width or crosswise width of the substrate, and a coating time of 0.5-10 seconds is more preferred. Even when the coating fluid is coated in a short time, a dry coating weight of 0.01-30 g per 1 $m^2$ of the substrate can be obtained, and the coating weight is preferably 0.01-20 g. The thickness of the coating film can be optionally controlled, and the thickness can be about 10 nm-50 µm, preferably about 10 nm-10 µm, more preferably about 50 nm-1.0 µm. Furthermore, in the present invention, even one coating can give a sufficient coating weight, and in many cases, one coating which is repeated with about ⅓ of the overlap may be sufficient, but in case the larger coating weight is needed, recoating of twice to several times can be carried out. After coating, the coat can be cured by successively drying the coating surface by air-drying or with air of the air curtain. In many cases, drying and curing can be sufficiently performed by air-drying or with air, but when curing at higher temperatures is necessary, the coating surface may be heated to about 300° C., more preferably about 150° C. using a heater. The heating time can be optionally set, and is preferably about 10-15 minutes. When an ultraviolet curable binder component is used, the coating film is cured by irradiation with ultraviolet rays. Furthermore, in the case of giving gloss, the surface of the coating film can be polished with a polisher. Therefore, in the present invention, a dry coating weight of 0.01-30 g per 1 $m^2$ of the substrate can be obtained by coating once for 0.3-30 seconds per 1 m of the substrate and drying the coat by air-drying or with air of the air curtain to remove the solvent.

As the substrates, there can be used various articles such as inorganic articles, organic articles and composite articles thereof, and they include, for example, those of ceramics such as glass, tile, concrete, mortar and earthen ware, metallic materials, plastic materials, paper materials, wood materials, etc. Specifically, the coating fluid can be applied to various articles, for example, glass members of buildings such as window glasses, outer walls, doors, fences, and gates of buildings, walls, ceilings, doors, floors, tableware and furniture in rooms of buildings, particularly, floors, walls and doors of bathrooms, ceilings, ranges and ventilation fans of kitchens, toilet stools and doors of toilets, front glass, side glass and rear glass of automobiles and tram cars, and others. Furthermore, in addition to using the above articles as the substrates, an ultraviolet-screening coating film or infrared-screening coating film is previously formed on the surface of substrates and then they can be worked into the articles. When the surface of substrates on which coating film is to be formed is previously polished with glass compounds, abraded with sanders, or washed with at least one of water, alcohols, acids and alkalis and then coated with the coating fluid, the adhesion strength of the coating film can be enhanced. In the case of a glass substrate, it is preferred to remove pollutants and oils from the surface using glass compound, further wash the surface with alcohol, and then coat the coating fluid. The substrate can be coated as it is, but it is also possible to previously subject the surface thereof to primer treatment or sealer treatment or form an undercoat or intercoat, and thereafter coat the coating fluid. Furthermore, after formation of the ultraviolet-screening film or infrared-screening film, a protective layer containing the binder component and the like may be formed on the film.

The coating film of the present invention formed by using a coating fluid ejection nozzle having a large tip bore diameter under low pressures has sufficient strength according to pencil hardness test, durability test and abrasion resistance test, and shows less uneven coating and mottling and has substantially no spotting, blushing, partial breakage and cracks as a result of visual examination. Furthermore, a coating film which can screen 90% or more of ultraviolet rays or 40% or more of near infrared rays can be formed. The transmittance for ultraviolet rays and infrared rays is measured by a spectrophotometer. Since the film thickness can be suitably controlled by adjusting the total solid concentration, a film thickness of about 10 nm-50 µm, preferably 10 nm-10 µm can be obtained, and a coating film having a thickness of about 50 nm-5 µm and excellent in transparency can be obtained. Furthermore, a preferred coating film having a visible light transmittance of 85% or more can also be obtained. Moreover, there can also be obtained a coating film less in blushing or haze which has a haze value of 0.5% or less, furthermore, 0.3% or less. A haze meter NDH 300A manufactured by Nippon Denshoku Kogyo K.K. is used for measurement of the visible light transmittance and haze value. In this way, articles can be obtained which have on the surface a coating film containing an ultraviolet-screening agent and/or an infrared-screening agent and have a film thickness of 10 nm-10 µm. Preferred embodiments are glass articles having on the surface a coating film containing an ultraviolet-screening agent and/or an infrared-screening agent, and automobiles having front glass, rear glass and side glass on a part of which is formed a coating film containing an ultraviolet-screening agent and/or an infrared-screening agent.

EXAMPLES

The present invention will be explained in more detail by the following examples.

Example 1

The following coating fluid was spray coated on a soda-lime glass plate (150×70×6 mm) using a spray type warm air low pressure coater, and the coat was dried at room temperature to form a coating film. The dry coating weight was 2.8 g/m². The resultant coating film was transparent with light gray, and could screen 40% of near infrared rays and 90% of ultraviolet rays.

Composition of the coating fluid:

| | |
|---|---|
| (1) Binder component: Silicone resin | 5% by weight |
| (2) Infrared-screening agent: Antimony-doped tin oxid | 3% by weight |
| (3) Infrared-screening agent: Ruthenium oxide | 1% by weight |
| (4) Ultraviolet-screening agent: Benzotriazole | 1% by weight |
| (5) Solvent: Propylene glycol | 90% by weight |

Coating was carried out using a spray type warm air low pressure coater (SG-91 manufactured by Chiron GmbH) provided with a blower of high rotation type turbine under the following conditions.

(1) Tip bore diameter of coating fluid ejection nozzle: 1.2 mm
(2) Ejection pressure: 0.018 MPa
(3) Ejection amount: 70 ml/min
(4) Air blowing pressure of blower: 0.018 MPa
(5) Air flow of air curtain: 2200 liters/min
(6) Air temperature of air curtain: Higher by 15° C. than environment temperature of coating operation
(7) Coating speed: The coater was moved at a rate of 3 seconds per 1 m of the width of the surface to be coated.

As pretreatments of soda-lime glass plate used as a substrate, pollutants and ails were sufficiently removed using a commercially available glass compound and furthermore the substrate was washed with isopropyl alcohol.

Example 2

A coating film was formed in the same manner as in Example 1, except that the following coating fluid was used. The dry coating weight was 8.4 g/m². The resulting coating film was transparent with light gray, and could screen 40% of near infrared rays and 90% of ultraviolet rays.

Composition of the coating fluid:

| | |
|---|---|
| (1) Binder component: Silicone resin | 20% by weight |
| (2) Infrared-screening agent: Antimony-doped tin oxide | 6% by weight |
| (3) Infrared-screening agent: Ruthenium oxide | 1% by weight |
| (4) Ultraviolet-screening agent: Benzotriazole | 3% by weight |
| (5) Solvent: Propylene glycol | 70% by weight |

Comparative Example 1

A coating film was formed in the same manner as in Example 1, except that the tip bore diameter of the coating fluid ejection nozzle of the warm air low pressure coater was 0.3 mm and the coating was carried out under the following conditions.

(1) Tip bore diameter of coating fluid ejection nozzle: 0.3 mm
(2) Ejection pressure: 0.018 MPa
(3) Ejection amount: 18 ml/min
(4) Air blowing pressure of blower: 0.018 MPa
(5) Air flow of air curtain: 2200 liters/min
(6) Air temperature of air curtain: Higher by 15° C. than environment temperature of coating operation.
(7) Coating speed: The coater was moved at a rate of 3 seconds per 1 m of the width of the surface to be coated.

The dry coating weight of the resulting coating film was 0.7 g/m², and mottling occurred. The near infrared screening rate of the resulting coating film was 10% and ultraviolet screening rate was 20%.

Comparative Example 2

A coating film was formed in the same manner as in Comparative Example 1, except that recoating of three times was carried out using the warm air low pressure coater of Comparative Example 1. The dry coating weight of the resulting coating film was 2 g/m², but the coating film had spotting and lowered in transparency as compared with the uncoated glass plate and was insufficient in hardness.

INDUSTRIAL APPLICABILITY

According to the coating process of the present invention, there can be formed on the surface of any articles an ultraviolet-screening film or infrared-screening film which is excellent in durability and abrasion resistance, less in the problems of uneven coating, mottling, spotting, blushing, partial breakage, or cracking. Furthermore, a uniform coating film can be simply formed by single coating under any operating environments, and besides transparency of the film can be sufficiently ensured. Therefore, incident ultraviolet rays can be intercepted by utilizing such ultraviolet-screening coating film, and thus the articles can be prevented from fading or discoloration caused with sunlight and human bodies can be protected from harmful ultraviolet rays. Moreover, rising of temperature in rooms or automobiles can be inhibited by utilizing the infrared-screening coating film.

The invention claimed is:

1. A coating process for forming a coating film onto a surface of a glass substrate, comprising
    coating on the glass substrate a coating fluid comprised of at least one of an ultraviolet-screening agent having a particle diameter of 1-100 nm and an infrared-screening agent, a binder component and 50-95% by weight of a polyhydric alcohol solvent selected from the group consisting of ethylene glycol, propylene glycol, trimethylene glycol, 1,4-butanediol, 1,5-pentanediol, 1,6-hexanediol, and 1,7-heptanediol with a coater having a fluid ejection nozzle with a tip bore diameter of 1.0-2.0 mm at an ejection pressure of 0.01-0.05 MPa; and
    drying the coated glass substrate solely by heated air to form a coating film having a visible light transmittance of 85% or more.
2. A coating process according to claim 1, wherein the polyhydric alcohol is propylene glycol.

3. A coating process according to claim 1, wherein the coating fluid contains the polyhydric alcohol in an amount of 70-90% by weight.

4. A coating process according to claim 1, wherein the amount of the coating fluid ejected from the ejection nozzle is in the range of 30-200 mL/min.

5. A coating process according to claim 1, wherein the coating fluid has a total solid concentration of 5-50% by weight and contains the binder component in an amount of 4-49% by weight.

6. A coating process according to claim 1, wherein the coater is provided with a blower for forming an air curtain.

7. A coating process according to claim 6, wherein the air blowing pressure of the blower is 0.01-0.098 MPa.

8. A coating process according to claim 6, wherein the air temperature of the air curtain is higher by at least 10° C. than the temperature of coating environment.

9. A coating process according to claim 1, wherein the coating fluid is coated one time for 0.3-30 seconds per 1 in onto the glass substrate and the glass coated substrate is dried to remove the solvent and form a dry coating having a weight of 0.01-30 g per I m².

10. A coating process according to any one of claims 1 and 2-9, wherein the glass substrate is at least a part of glass members of buildings.

11. A coating process according to claim 1, wherein the glass substrate is at least a part of front glass, rear glass or side glass of automobiles.

12. A coating process according to claim 10, wherein the ultraviolet-screening agent is comprised of at least one of a benzotriazole compound, a benzophenone compound, titanium dioxide, hydrous titanium oxide, hydrated titanium oxide, metatitanic acid, orthotitanic acid, titanium hydroxide, zinc oxide, zinc silicate and cerium oxide.

13. A coating process according to claim 10, wherein the infrared-screening agent is comprised of at least one of a perylene compound, an aniline compounds, a cyanine compound, antimony-doped tin oxide, indium-doped tin oxide, tin-doped indium oxide, aluminum-doped zinc oxide, mica-titanium, iron oxide-coated mica, basic lead carbonate, bismuth oxychloride, selenium oxide, zinc oxide, titanium dioxide, rhodium oxide, ruthenium oxide, metal complexes of copper, silver, iron and manganese, aluminum, gold, silver, copper, chromium, nickel, indium, palladium and tin, and alloys thereof.

* * * * *